US012587815B2

(12) United States Patent
Yokoyama

(10) Patent No.: US 12,587,815 B2
(45) Date of Patent: Mar. 24, 2026

(54) CALL SUPPORT SYSTEM, CALL SUPPORT METHOD, AND RECORDING MEDIUM

(71) Applicant: HONDA MOTOR CO., LTD., Tokyo (JP)

(72) Inventor: Hajime Yokoyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 330 days.

(21) Appl. No.: 18/409,199

(22) Filed: Jan. 10, 2024

(65) Prior Publication Data

US 2024/0334167 A1     Oct. 3, 2024

(30) Foreign Application Priority Data

Mar. 28, 2023     (JP) ................................. 2023-052061

(51) Int. Cl.
| | |
|---|---|
| *H04M 3/42* | (2006.01) |
| *G08B 5/36* | (2006.01) |
| *H04W 4/40* | (2018.01) |

(52) U.S. Cl.
CPC ................ *H04W 4/40* (2018.02); *G08B 5/36* (2013.01)

(58) Field of Classification Search
CPC . H04W 4/40; G08B 5/36; H04N 7/15; H04M 3/568
USPC ....................................................... 455/414.1
See application file for complete search history.

(56) References Cited

U.S. PATENT DOCUMENTS

| | | | | |
|---|---|---|---|---|
| 6,269,256 | B1 * | 7/2001 | Nakamura | .......... H04M 1/0214 455/567 |
| 7,046,961 | B2 * | 5/2006 | Park | ...................... H04W 76/18 455/566 |
| 9,863,112 | B2 * | 1/2018 | Laugwitz | ................ E01C 19/40 |
| 10,237,268 | B2 * | 3/2019 | Price | ...................... H04L 63/083 |
| 10,685,664 | B1 * | 6/2020 | Kristjansson | ........... G06F 3/167 |
| 11,120,649 | B2 * | 9/2021 | Habermalz | ........... B60R 16/023 |
| 11,474,499 | B2 * | 10/2022 | Yamamoto | .............. G06F 3/167 |
| 11,783,831 | B1 * | 10/2023 | Lantin | ....................... H04L 9/14 704/275 |
| 11,887,590 | B2 * | 1/2024 | D'Souza | .......... H04M 3/42204 |
| 11,922,938 | B1 * | 3/2024 | Khan | ....................... G10L 15/32 |
| 12,447,823 | B2 * | 10/2025 | Battlogg | ................. G05G 5/03 |
| 2019/0302583 | A1 | 10/2019 | Taniguchi et al. | |

FOREIGN PATENT DOCUMENTS

JP     2019-174693 A     10/2019

* cited by examiner

*Primary Examiner* — Amancio Gonzalez
(74) *Attorney, Agent, or Firm* — Rankin, Hill & Clark LLP

(57)     ABSTRACT
A call support system includes: a speech transmission mode switch unit that switches between a speech transmission permission mode that permits execution of call source speech transmission processing for speech of a user by a call control unit and a speech transmission prohibition mode that prohibits execution of the call source speech transmission processing for the speech of the user by the call control unit; and a light emitting part state control unit that puts a light emitting part, provided in a mobile body to be visible to the user, in a first visible state when the speech transmission permission mode is active, and puts the light emitting part in a second visible state different from the first visible state when the speech transmission prohibition mode is active.

10 Claims, 5 Drawing Sheets

| CONTROL PATTERN | SPEECH TRANSMISSION PERMISSION MODE (FIRST VISIBLE STATE) | SPEECH TRANSMISSION PROHIBITION MODE (SECOND VISIBLE STATE) | CALL DESTINATION TALKING (THIRD VISIBLE STATE) |
|---|---|---|---|
| FIRST PATTERN | LIT IN GREEN | TURNED OFF | P1: LIT IN BLUE, P2: LIT IN ORANGE |
| SECOND PATTERN | LIT IN GREEN | FLASHED IN GREEN | P1: LIT IN BLUE, P2: LIT IN ORANGE |
| THIRD PATTERN | LIT IN GREEN | LIT IN RED | P1: LIT IN BLUE, P2: LIT IN ORANGE |
| FOURTH PATTERN | LIT IN GREEN AT HIGH LUMINANCE | LIT IN GREEN AT LOW LUMINANCE | P1: LIT IN BLUE, P2: LIT IN ORANGE |
| FIFTH PATTERN | FIRST FLASHING PATTERN | SECOND FLASHING PATTERN | P1: LIT IN BLUE, P2: LIT IN ORANGE |

FIG.5

| CONTROL PATTERN | SPEECH TRANSMISSION PERMISSION MODE (FIRST VISIBLE STATE) | SPEECH TRANSMISSION PROHIBITION MODE (SECOND VISIBLE STATE) | CALL DESTINATION TALKING (THIRD VISIBLE STATE) |
|---|---|---|---|
| FIRST PATTERN | LIT IN GREEN | TURNED OFF | P1: LIT IN BLUE, P2: LIT IN ORANGE |
| SECOND PATTERN | LIT IN GREEN | FLASHED IN GREEN | P1: LIT IN BLUE, P2: LIT IN ORANGE |
| THIRD PATTERN | LIT IN GREEN | LIT IN RED | P1: LIT IN BLUE, P2: LIT IN ORANGE |
| FOURTH PATTERN | LIT IN GREEN AT HIGH LUMINANCE | LIT IN GREEN AT LOW LUMINANCE | P1: LIT IN BLUE, P2: LIT IN ORANGE |
| FIFTH PATTERN | FIRST FLASHING PATTERN | SECOND FLASHING PATTERN | P1: LIT IN BLUE, P2: LIT IN ORANGE |

CALL SUPPORT SYSTEM, CALL SUPPORT METHOD, AND RECORDING MEDIUM

INCORPORATION BY REFERENCE

The present application claims priority under 35 U.S.C. § 119 to Japanese Patent Application No. 2023-052061 filed on Mar. 28, 2023. The content of the application is incorporated herein by reference in its entirety.

BACKGROUND OF THE INVENTION

Field of the Invention

The present invention relates to a call support system, a call support method, and a recording medium.

Description of the Related Art

In recent years, there has been an increased effort to provide access to sustainable transportation systems in consideration of even those vulnerable, such as elderly persons, handicapped persons, and children, among traffic participants. In order to achieve this goal, research and development efforts are being made for further improvement in traffic safety and convenience through development related to comfortability in a vehicle.

For example, Japanese Patent Laid-Open No. 2019-174693 discloses the configuration in which when an occupant of the vehicle participates in an electronic meeting, output and non-output from a speaker in the vehicle are switched and microphone sensitivity to the voice of the occupant is adjusted in accordance with the state of the vehicle.

Incidentally, in terms of the comfortability in a vehicle, it is desirable that the driver of a vehicle can participate in an electronic meeting in an environment similar to that in the case of participating in the electronic meeting from an office or the like.

Accordingly, an object of the present invention is to suppress that driving operation is affected by participation in an electronic meeting.

In order to accomplish the above object, the present invention aims at providing a call support system, a call support method, and a recording medium, capable of suppressing that the driving operation is affected by the driver of a mobile body, such as a vehicle, participating in an electronic meeting. Accordingly, the present invention contributes to the development of sustainable transportation systems.

SUMMARY OF THE INVENTION

As a first aspect to accomplish the above object, a call support system is provided. The call support system includes: a call control unit that executes call source speech transmission processing for transmitting call source speech information, corresponding to speech of a user of a mobile body that is input into a microphone used in the mobile body, to a call destination communication terminal used by a call partner; a speech transmission mode switch unit that switches between a speech transmission permission mode that permits execution of the call source speech transmission processing for the speech of the user by the call control unit and a speech transmission prohibition mode that prohibits execution of the call source speech transmission processing for the speech of the user by the call control unit; and a light emitting part state control unit that puts a light emitting part, provided in the mobile body to be visible to the user, in a first visible state when the speech transmission permission mode is active, and puts the light emitting part in a second visible state, different from the first visible state, when the speech transmission prohibition mode is active.

The call support system may be configured such that the light emitting part state control unit switches the light emitting part between the first visible state and the second visible state by changing at least one of light emission color, illuminance, lighting and flashing, and a flashing pattern of the light emitting part.

The call support system may be configured such that the call control unit executes call destination speech reception processing for receiving call destination speech information corresponding to speech of the call partner that is transmitted from the call destination communication terminal to output voice corresponding to the call destination speech information received by the call destination speech reception processing from a speaker used in the mobile body, and the light emitting part state control unit puts the light emitting part in a third visible state that is different from the first visible state and the second visible state when the voice corresponding to the call destination speech information is output from the speaker by execution of the call destination speech reception processing by the call control unit.

The call support system may be configured such that the light emitting part includes a first light emitting part and a second light emitting part, the call control unit executes call destination speech reception processing for receiving call destination speech information, corresponding to speech of a plurality of call partners transmitted from a plurality of call destination communication terminals, while identifying the respective call partners, and outputs voice corresponding to the call destination speech information received by the call destination speech reception processing from a speaker used in the mobile body, and the light emitting part state control unit puts the first light emitting part in the first visible state or the second visible state, and when the voice corresponding to the call destination speech information is output from the speaker by execution of the call destination speech reception processing by the call control unit, the light emitting part state control unit puts the second light emitting part in a visible state set for the call partner corresponding to the voice output from the speaker, out of visible states individually set for the respective call partners.

The call support system may be configured such that the light emitting part is also used to notify a setting status of equipment provided in the mobile body, and the first visible state and the second visible state are set to visible states different from the visible state when the setting status of the equipment is notified.

The call support system may be configured such that the light emitting part includes a first light emitting part and a second light emitting part, the light emitting part state control unit puts the first light emitting part in the first visible state or the second visible state, and puts the second light emitting part in a visible state that notifies a setting state of equipment provided in the mobile body.

The call support system may be configured such that the microphone collects speech of the user who is seated on a driver seat provided in the mobile body, and the light emitting part is provided in an interior part in a vicinity of the driver seat of the mobile body.

The call support system may be configured such that the light emitting part is provided individually for each of a plurality of seats provided in the mobile body, and the microphone is individually used by each user of the plurality of seats, the call control unit executes the call source speech transmission processing for each of the plurality of users, the speech transmission mode switch unit switches between the speech transmission permission mode and the speech transmission prohibition mode for each of the plurality of users, and the light emitting part state control unit puts the light emitting parts provided on the seats, used by the users who participate in an identical electronic meeting, out of the plurality of users, in the first visible state or the second visible state in response to switching between the speech transmission permission mode and the speech transmission prohibition mode by the speech transmission mode switch unit.

In order to accomplish the above object, a second aspect relates to a call support method executed by a computer. The call support method includes: a call control step of executing call source speech transmission processing for transmitting call source speech information, corresponding to speech of a user of a mobile body that is input into a microphone used in the mobile body, to a call destination communication terminal used by a call partner; a speech transmission mode switch step of switching a speech transmission permission mode that permits execution of the call source speech transmission processing for the speech of the user in the call control step and a speech transmission prohibition mode that prohibits execution of the call source speech transmission processing for the speech of the user in the call control step; and a light emitting part state control step of putting a light emitting part, provided in the mobile body to be visible to the user, in a first visible state when the speech transmission permission mode is active, and putting the light emitting part in a second visible state, different from the first visible state, when the speech transmission prohibition mode is active.

In order to accomplish the above object, a third aspect relates to a non-transitory recording medium storing a program that causes a computer to function as: a call control unit that executes call source speech transmission processing for transmitting call source speech information, corresponding to speech of a user of a mobile body that is input into a microphone used in the mobile body, to a call destination communication terminal used by a call partner; a speech transmission mode switch unit that switches between a speech transmission permission mode that permits execution of the call source speech transmission processing for the speech of the user by the call control unit and a speech transmission prohibition mode that prohibits execution of the call source speech transmission processing for the speech of the user by the call control unit; and a light emitting part state control unit that puts a light emitting part, provided in the mobile body to be visible to the user, in a first visible state when the speech transmission permission mode is active, and puts the light emitting part in a second visible state, different from the first visible state, when the speech transmission prohibition mode is active.

The call support system, the call support method, and the recording medium can suppress that the driving operation is affected by the driver of a mobile body, such as a vehicle, participating in an electronic meeting.

BRIEF DESCRIPTION OF THE DRAWINGS

FIG. 5 is an explanatory view of a control pattern of the visible state of the driver-seat light emitting part.

DETAILED DESCRIPTION OF THE PREFERRED EMBODIMENTS

1. Configuration of Call Support System

Figure 1:
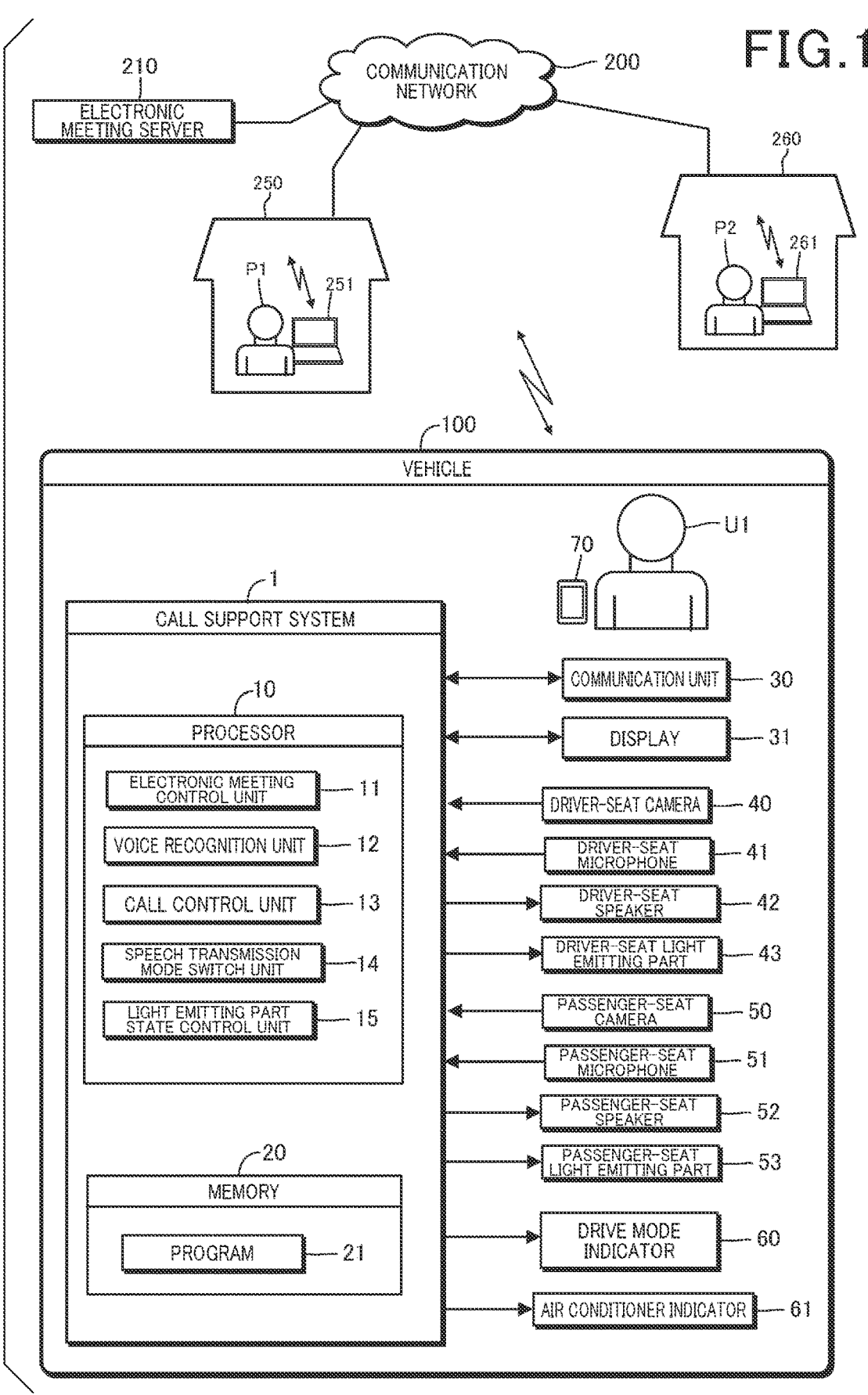
FIG. 1 is a configuration diagram of a vehicle including a call support system.

The configuration of a call support system 1 of the present disclosure will be described with reference to FIGS. 1 to 3. The call support system 1 is mounted on a vehicle 100 to execute processing to support call of a user U1 riding on the vehicle 100. FIG. 1 illustrates the situation where the user U1, who drives the vehicle 100, uses an electronic meeting service provided by an electronic meeting server 210 to talk with other participants P1 and P2 through the electronic meeting.

The participant P1 operates a communication terminal 251 from a house 250, such as a home residence, to access the electronic meeting server 210 and participate in an electronic meeting. The communication terminal 251 is, for example, a personal computer, a tablet terminal, or a smartphone, having the function to communicate through a communication network 200. Similarly, the participant P2 operates a communication terminal 261 from a house 260 to access the electronic meeting server 210 and participate in the electronic meeting. The participants P1 and P2 correspond to call partners in the present disclosure.

The call support system 1 is connected to a communication unit 30, a display 31, a driver-seat camera 40, a driver-seat microphone 41, a driver-seat speaker 42, a driver-seat light emitting part 43, a passenger-seat camera 50, a passenger-seat microphone 51, a passenger-seat speaker 52, a passenger-seat light emitting part 53, a drive mode indicator 60, and an air conditioner indicator 61, which are provided in the vehicle 100.

The call support system 1 uses the communication unit 30 to perform communication among the electronic meeting server 210, the communication terminal 251, and the communication terminal 261 through the communication network 200. The call support system 1 also uses the communication unit 30 to communicate with a mobile terminal 70 used by the user U1 and a mobile terminal 71 used by the user U2 (see FIG. 2). The mobile terminals 70 and 71 are smartphones, mobile phones, tablet terminals, or the like.

The display 31 is a touch panel display with touch sensors disposed on the surface of a flat display panel. Through the display 31, operation signals in response to touch operations of the users U1 and U2 are input to the call support system 1. The screen display of the display 31 is controlled in response to control signals output from the call support system 1.

Figure 2:
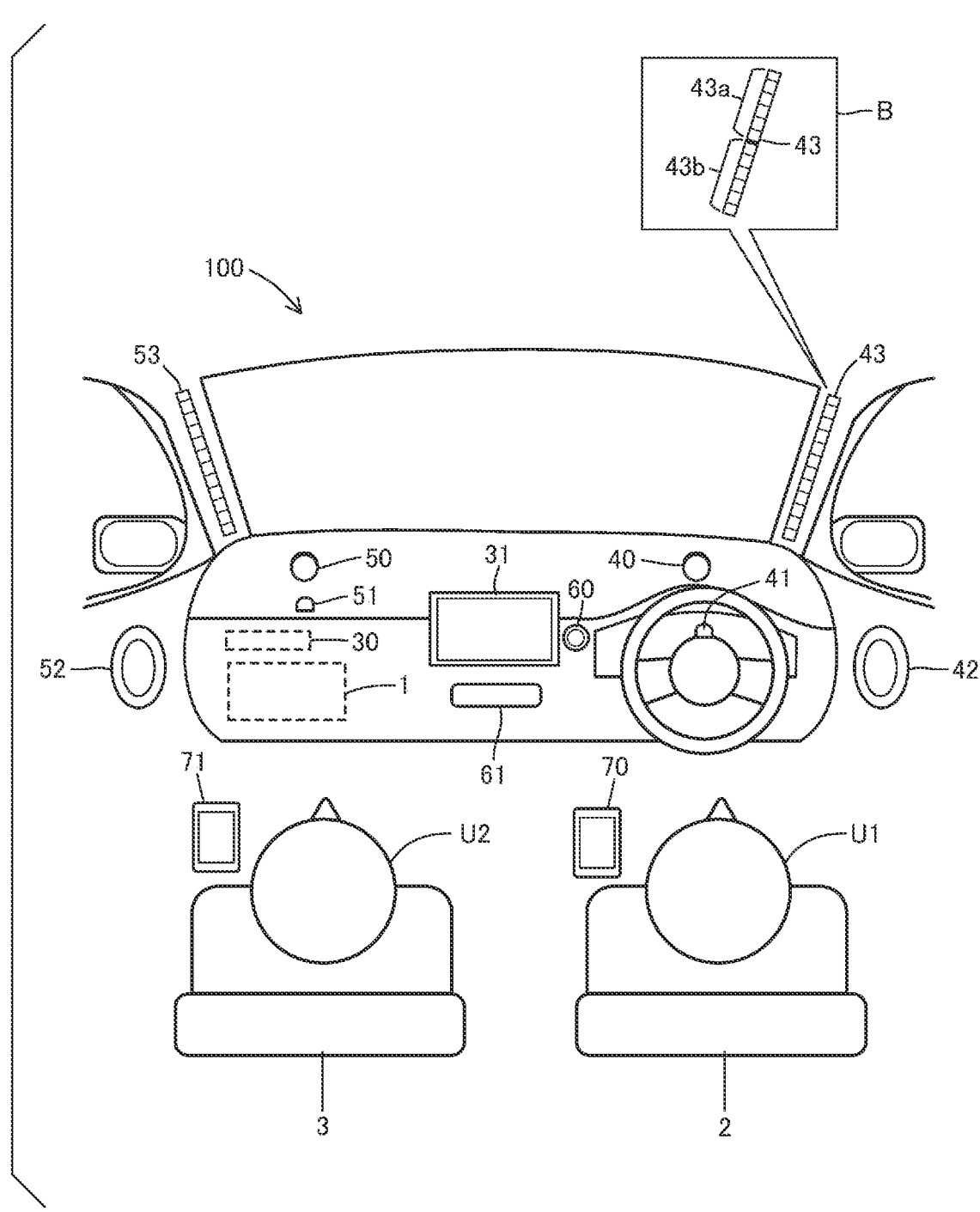
FIG. 2 is a configuration diagram of the vehicle in the vicinity of a driver seat and a passenger seat.

With reference to FIG. 2, the driver-seat camera 40 is provided on a dashboard in front of a driver seat 2 of the vehicle 100 to capture an image of the user U1 seated on the driver seat 2 and input the captured image to the call support system 1. The driver-seat microphone 41 is provided on a steering wheel in front of the driver seat 2 to collect the speech of the user U1 seated on the driver seat 2 and input voice signals corresponding to the speech into the call support system 1. The driver-seat speaker 42 is provided on a driver-seat door to amplify and output voice signals and the like output from the call support system 1. The driver-seat light emitting part 43 is provided in an interior part of a front pillar (A-pillar) on the side of the driver seat 2, and the visible state (the light emission state, the operation state) of the driver-seat light emitting part 43 is controlled in response to a control signal output from the call support system 1.

The passenger-seat camera 50 is provided on a dashboard in front of a passenger seat 3 of the vehicle 100 to capture an image of the user U2 seated on the passenger seat 3 and input the captured image to the call support system 1. The passenger-seat microphone 51 is provided on the dashboard in front of the passenger seat 3 to collect the speech of the user U2 seated on the passenger seat 3 and input voice signals corresponding to the speech into the call support system 1. The passenger-seat speaker 52 is provided on a passenger-seat door to amplify and output voice signals and the like output from the call support system 1. The passenger-seat light emitting part 53 is provided in an interior part of a front pillar on the side of the passenger seat 3, and its visible state (a light emission state, an operation state) is controlled in response to a control signal output from the call support system 1.

The driver-seat light emitting part 43 and the passenger-seat light emitting part 53 are LEDs, for example. The driver-seat light emitting part 43 may be divided into a first light emitting part 43*a* and a second light emitting part 43*b* as shown in a bubble B, and the visible states of the first light emitting part 43*a* and the second light emitting part 43*b* may individually be controllable. The same is true for the passenger-seat light emitting part 53.

The drive mode indicator 60 is, for example, an LED, and its light emission color is changed based on a drive mode of the vehicle 100 selected by the user U1. The drive mode is selected, for example, from any one of an economy mode, a normal mode, and a sport mode. The light emission color of the drive mode indicator 60 is controlled to be green in the economy mode, blue in the normal mode, and red in the sport mode. The air conditioner indicator 61 is, for example, an LED that displays an operating state (on state and off state), a set temperature, a set amount of wind, and the like, of an air conditioner provided in the vehicle 100.

The call support system 1 is a control unit including a processor 10, and a memory 20. The processor 10 may be a single processor or a multiprocessor. The memory 20 stores a program 21 for control of the call support system 1. The program 21 may be read from a recording medium (such as magnetic disks, optical disks, and flash memories) and stored in the memory 20, or may be downloaded from an external server or the like and stored in the memory 20 through a communication network 200.

When reading and executing the program 21, the processor 10 functions as an electronic meeting control unit 11, a voice recognition unit 12, a call control unit 13, a speech transmission mode switch unit 14, and a light emitting part state control unit 15. Here, the processing executed by the call control unit 13 corresponds to the call control step in the call support method of the present disclosure. The processing executed by the speech transmission mode switch unit 14 corresponds to the speech transmission mode switch step in the call support method of the present disclosure. The processing executed by the light emitting part state control unit 15 corresponds to the light emitting part state control step in the call support method of the present disclosure.

The electronic meeting control unit 11 controls entry and exit of the user U1 to and from an electronic meeting in response to the touch operation on the display 31 by the user U1. Here, FIG. 3 shows the screen of the display 31 corresponding to the use of the electronic meeting. Displayed on the left side of the screen of the display 31 are a navigation button 300 for selecting a navigation function, a music button 301 for selecting a music function, and an electronic meeting button 302 for selecting an electronic meeting function.

When the user U1 touch-operates the navigation button 300, a screen for using a navigation device included in the vehicle 100 is displayed on the display 31, and when the user U1 touch-operates the music button 301, a screen for using a music reproduction device included in the vehicle 100 is displayed on the display 31.

When the user U1 operates the electronic meeting button 302, the electronic meeting control unit 11 accesses the electronic meeting server 210, extracts a registered electronic meeting or meetings that the user U1 can participate in, and displays a participation waiting screen 310 for the extracted electronic meeting or meetings on the display 31. The participation waiting screen 310 displays a join meeting button 311, an end meeting button 312, a microphone button 313, and a camera button 314.

The join meeting button 311 is a button used to apply for participation in an electronic meeting. In response to the touch operation on the join meeting button 311 by the user U1, the electronic meeting control unit 11 transmits information on application for participating in an electronic meeting to the electronic meeting server 210. As a result, the electronic meeting server 210 executes the processing to arrange participation of the user U1 in the electronic meeting, so that the user U1 is in the state of participating in the electronic meeting, and the electronic meeting control unit 11 switches the screen on the display 31 to an in-meeting screen 320. The in-meeting screen 320 displays participant icons 321, 322, and 323 indicating that the user U1 and other participants P1 and P2 are participating in the electronic meeting. Participants P1 and P2 are also referred to as call partners P1 and P2 in the following.

The end meeting button 312 is a button used to apply for ending the electronic meeting (exit of the user U1 from the electronic meeting). In response to the touch operation on the end meeting button 312 by the user U1, the electronic meeting control unit 11 transmits information on application for ending the electronic meeting to the electronic meeting server 210. As a result, the electronic meeting server 210 executes the processing to end participation of the user U1 in the electronic meeting.

The microphone button 313 is a button to instruct on and off switching of the driver-seat microphone 41. The camera button 314 is a button to instruct on and off switching of the driver-seat camera 40. Displays of the microphone button 313 and the camera button 314 are switched over based on on and off of the driver-seat microphone 41 and the driver-seat camera 40, respectively. FIG. 3 shows an example in which the driver-seat camera 40 is set to off, so that the camera button 314 is displayed with a diagonal line, and the driver-seat microphone 41 is set to on.

The voice recognition unit 12 analyzes the voice of the user U1 input into the driver-seat microphone 41 and recognizes the content of the speech of the user U1. The call control unit 13 executes speech transmission processing for transmitting call source speech information, which is obtained by converting the speech of the user U1 input into the driver-seat microphone 41 into digital data, to a communication terminal 251 of the call partner P1 and a communication terminal 261 of the call partner P2 via the electronic meeting server 210. When the driver-seat camera 40 is set to on, the call source speech information includes a facial image of the user U1 captured by the driver-seat camera 40.

The call control unit 13 receives the call destination speech information corresponding to the speech of the participant P1 transmitted from the communication terminal 251 via the electronic meeting server 210, and outputs the speech voice of the participant P1 from the driver-seat speaker 42. When outputting the speech voice of the participant P1 from the driver-seat speaker 42, the call control unit 13 performs highlighting, such as changing the display color, of the participant icon 322 in the in-meeting screen 320.

Similarly, the call control unit 13 receives the call destination speech information corresponding to the speech of the participant P2 transmitted from the communication terminal 261 via the electronic meeting server 210, and outputs the speech voice of the participant P2 from the driver-seat speaker 42. When outputting the speech voice of the participant P2 from the driver-seat speaker 42, the call control unit 13 performs highlighting, such as changing the display color, of the participant icon 323 of the participant P2 in the in-meeting screen 320.

In response to on and off switching operation of the driver-seat microphone 41 by operation of the microphone button 313, the speech transmission mode switch unit 14 switches between a speech transmission permission mode that permits execution of the call source speech transmission processing for the speech of the user U1 by the call control unit 13 and a speech transmission prohibition mode that prohibits execution of the call source speech transmission processing for the speech of the user U1 by the call control unit 13.

Here, switching between the speech transmission permission mode and the speech transmission prohibition mode may be achieved by changing the sensitivity of the driver-seat microphone 41 so as to switch between the state where the speech of the user U1 is input into the driver-seat microphone 41 and the state where the speech of the user U1 is not input into the driver-seat microphone 41. Alternatively, the speech transmission permission mode and the speech transmission prohibition mode may be switched based on whether or not to transmit the call source speech information while the state where the speech of the user U1 is input into the driver-seat microphone 41 is maintained.

When the state where the speech of the user U1 is input into the driver-seat microphone 41 is maintained, the voice recognition unit 12 recognizes the speech voice of the user U1 even in the speech transmission prohibition mode. Therefore, the user U1 can switch the speech transmission prohibition mode to the speech transmission permission mode by saying "microphone on" or other words.

The light emitting part state control unit 15 executes the processing to change the visible state of the driver-seat light emitting part 43 in response to switching between the speech transmission permission mode and the speech transmission prohibition mode by the speech transmission mode switch unit 14 and output of the speech of the participants P1 and P2 by the call control unit 13 from the driver-seat speaker 42. This processing will be described later in detail.

2. Control Processing of Visible State of Driver-Seat Light Emitting Part

Figure 4:
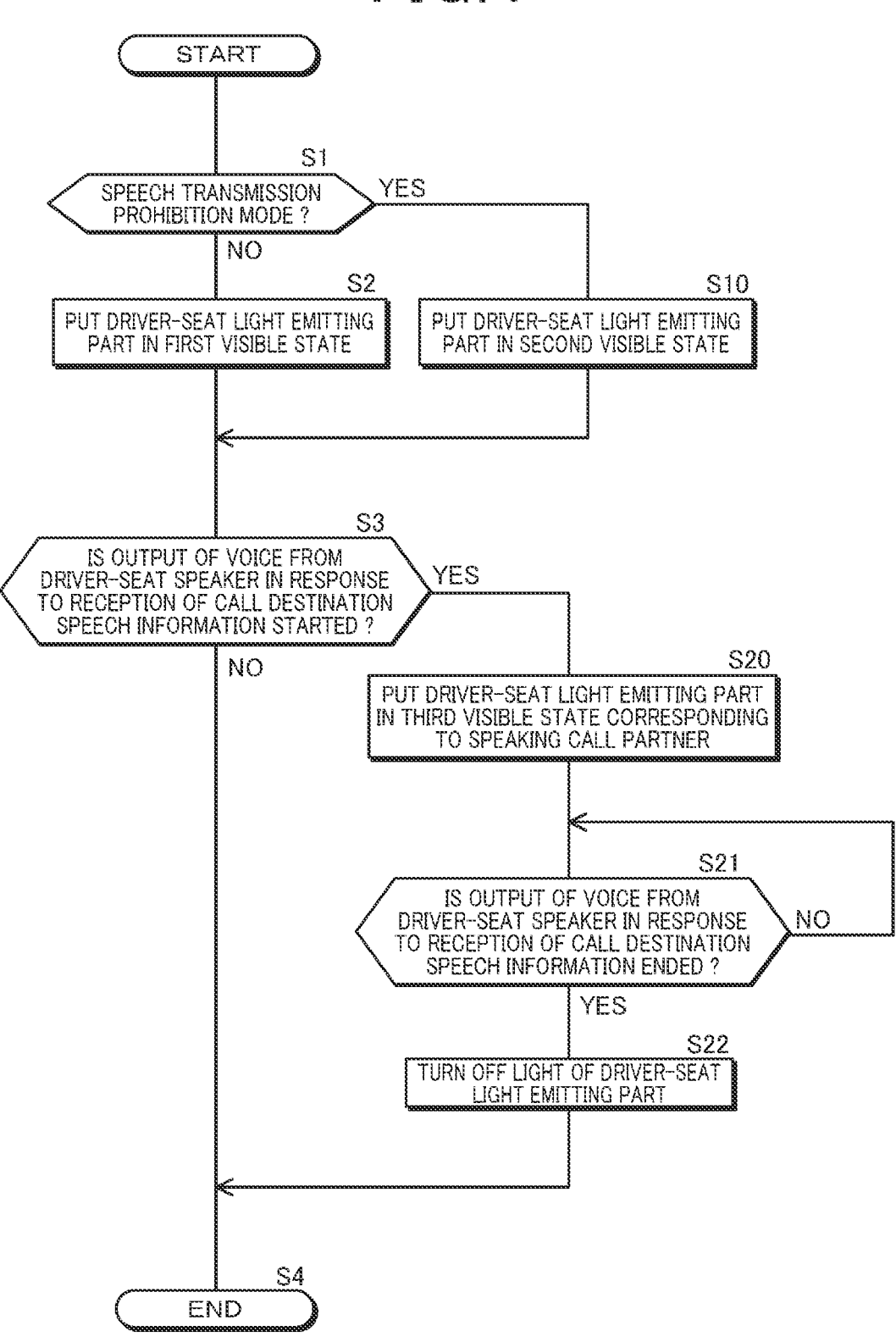
FIG. 4 is a flowchart of control processing of a visible state of a driver-seat light emitting part.

The control processing of the visible state of the driver-seat light emitting part 43 that is executed by the light emitting part state control unit 15 is described based on the flowchart shown in FIG. 4. When the user U1 is participating in an electronic meeting, the light emitting part state control unit 15 repeatedly executes the processing according to the flowchart shown in FIG. 4.

In step S1 of FIG. 4, the light emitting part state control unit 15 determines whether or not the speech transmission prohibition mode is set by the speech transmission mode switch unit 14. When the speech transmission prohibition mode is set, the light emitting part state control unit 15 advances the processing to step S10, and when the speech transmission prohibition mode is not set (the speech transmission permission mode is set), the light emitting part state control unit 15 advances the processing to step S2.

The light emitting part state control unit 15 puts the driver-seat light emitting part 43 in a first visible state in step S2, and puts the driver-seat light emitting part 43 in a second visible state that is different from the first visible state in step S10 with any one of control patterns illustrated in FIG. 5. For example, in a first pattern of FIG. 5, the light emitting part state control unit 15 lights the driver-seat light emitting part 43 in green in the first visible state, and turns off the light of the driver-seat light emitting part 43 in the second visible state.

Here, as shown in FIG. 2, the driver-seat light emitting part 43 is provided in an easy-to-see-location in front of the user U1 who performs the driving operation. Accordingly, the user U1 does not need to largely change the direction of the line of sight, as in the case of checking the microphone button 313 displayed on the display 31, and the user U1 can also intuitively recognize the visible state of the large-sized driver-seat light emitting part 43. Therefore, the user U1 can easily determine whether the speech transmission permission mode is set or the speech transmission prohibition mode is set by checking the visible state of the driver-seat light emitting part 43. This makes it possible to suppress that the driving operation of the user U1 is affected by on and off recognition of the driver-seat microphone 41.

In step S3, the light emitting part state control unit 15 determines whether or not the call control unit 13 starts to output the voice from the driver-seat speaker 42 in response to reception of call destination speech information. Then, when the sound output from the driver-seat speaker 42 is started, the light emitting part state control unit 15 advances the processing to step S20, and when the sound output from the driver-seat speaker 42 is not started, the light emitting part state control unit 15 advances the processing to step S4.

In step S20, the light emitting part state control unit 15 puts the driver-seat light emitting part 43 in a third visible state that is individually set for each of the participants P1 and P2 who are speakers of the voice output from the driver-seat speaker 42 as shown in FIG. 5. Specifically, the light emitting part state control unit 15 lights the driver-seat light emitting part 43 in blue when the speech voice of the participant P1 is output from the driver-seat speaker 42, and makes the driver-seat light emitting part 43 to emit light in orange when the speech voice of the participant P2 is output from the driver-seat speaker 42.

The user U1 can recognize that the participant P1 is speaking when the color of emission light of the driver-seat light emitting part 43 turns blue, and the user U1 can recognize that the participant P2 is speaking when the color of emission light of the driver-seat light emitting part 43 turns orange. Note that the driver-seat light emitting part 43 may be put in the first visible state, the second visible state, and the third visible state by using colors other than the colors of emission light shown in FIG. 5.

In this case, while the participant P1 or the participant P1 is speaking, it is not possible to recognize whether the speech transmission permission mode is set or the speech transmission prohibition mode is set based on the visible state of the driver-seat light emitting part 43. However, since the user U1 typically refrains from speaking while the participants P1 and P2 are speaking, it is assumed that the user U1 is unlikely to feel inconvenience. In next step S21, when the participant P1 or the participant P2 finished speaking, the light emitting part state control unit 15 advances the processing to step S22 to turn off the light of the driver-seat light emitting part 43, and advances the processing to step S4.

At the timing of next execution of the processing that is repeatedly executed according to the flowchart in FIG. 4, the driver-seat light emitting part 43 is put in the first visible state or the second visible state by the processing in step S2 or step S10. Accordingly, the call support system 1 returns to the state where the user U1 can recognize whether the speech transmission permission mode is set or the speech transmission prohibition mode is set based on the visible state of the driver-seat light emitting part 43.

Figure 3:
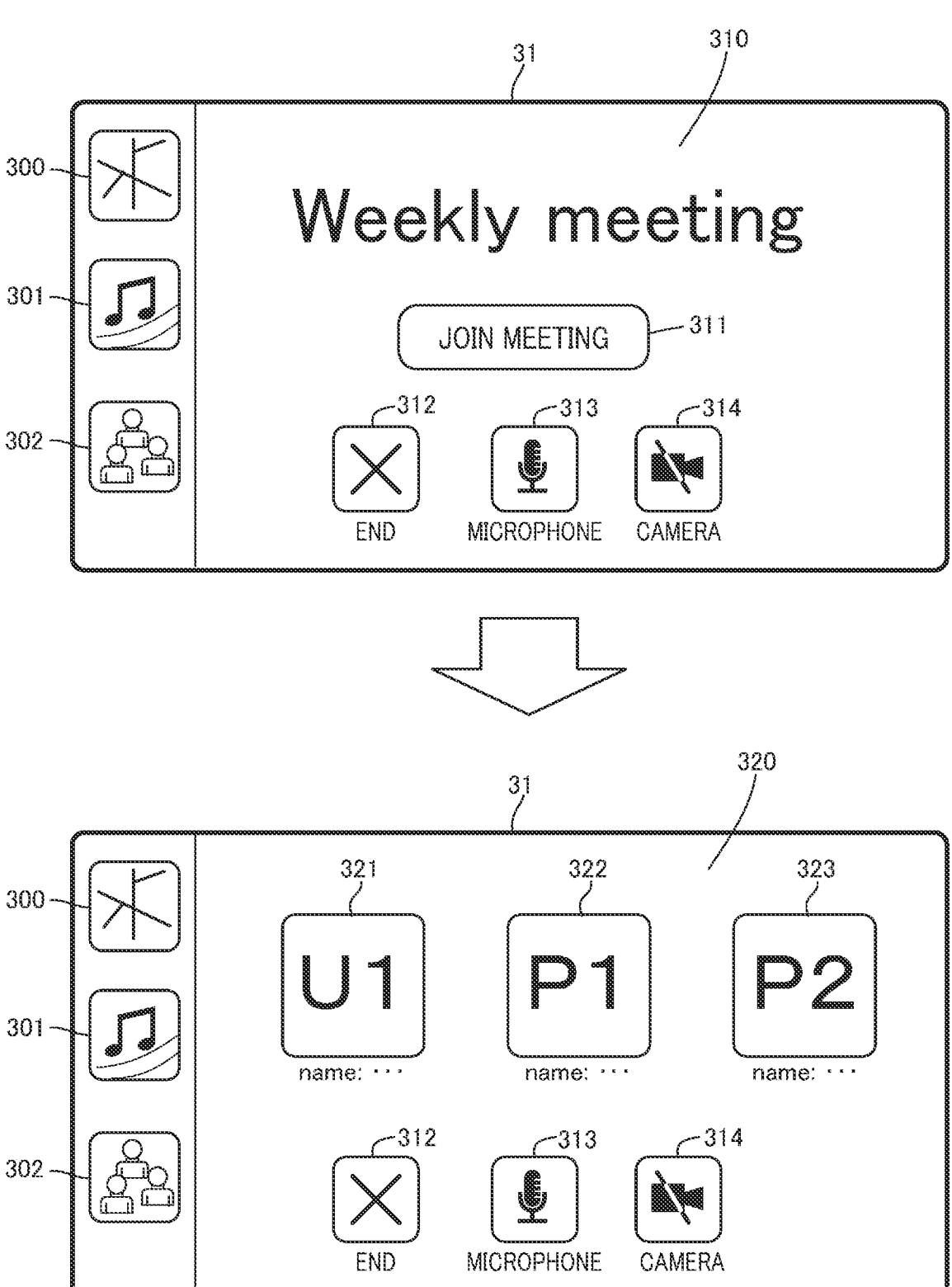
FIG. 3 is an explanatory view of a screen corresponding to an electronic meeting.

In this point, the color of emission light of the driver-seat light emitting part 43 in the third visible state may be the same as the display color of the participant icons 322 and 323 in the in-meeting screen 320 shown in FIG. 3. Specifically, when the participant P1 is speaking, the participant icon 322 may be displayed in blue and the driver-seat light emitting part 43 may emit light also in blue, and when the participant P2 is speaking, the participant icon 323 may be displayed in orange and the driver-seat light emitting part 43 may emit light also in orange.

As shown in FIG. 1, when the driver-seat light emitting part 43 includes the first light emitting part 43*a* and the second light emitting part 43*b*, and light emission of the first light emitting part 43*a* and light emission of the second light emitting part 43*b* can be controlled independently, the first light emitting part 43*a* may be controlled to be in the first visible state or the second visible state, and the second light emitting part 43*b* may be controlled to be in the third visible state.

3. Other Embodiments

In the above embodiment, the driver-seat light emitting part 43 is shown as the light emitting part of the present disclosure, though a light emitting part that is provided to indicate the setting state of equipment included in the vehicle 100 may be used as the light emitting part of the present disclosure. For example, as the visibility of the drive mode indicator 60 or the air conditioner indicator 61 shown in FIG. 1, the drive mode indicator 60 or the air conditioner indicator 61 may be made to emit light in the first visible state, the second visible state, and the third visible state.

For example, as described above, in the case where the drive mode of the vehicle 100 is switched between three stages of economy, normal, and sport, and the color of emission light of the drive mode indicator 60 is green in the economy mode, orange in the normal mode, and red in the sport mode, the drive mode indicator 60 may be constantly lit in the first visible state, and the drive mode indicator 60 may be flashed in the second visible state. In the third visible state, the drive mode indicator 60 may emit light in color other than the colors of the emission light (green, orange, and red) in the respective drive modes.

The driver-seat light emitting part 43 may also be used to notify the drive mode or the setting state of the equipment, such as an air conditioner, included in the vehicle 100. For example, when the driver-seat light emitting part 43 includes the first light emitting part 43*a* and the second light emitting part 43*b* as shown in the balloon B in FIG. 1, the first light emitting part 43*a* may be controlled to be in the first visible state and the second visible state in an electronic meeting, and the second light emitting part 43*b* may be controlled to have emission light color corresponding to the drive mode setting.

In the above embodiment, the light emitting part state control unit 15 performs the processing to put the driver-seat light emitting part 43 in the third visible state in response to the speech of the participants P1 and P2 who are participating in an electronic meeting. However, the light emitting part state control unit 15 may not perform the processing.

In the above embodiment, the case where the user U1 seated on the driver seat 2 participates in an electronic meeting has been described. However, the same processing is performed by the call support system 1 when the user U2 seated on the passenger seat 3 participates in the electronic meeting. Specifically, the speech transmission mode switch unit 14 switches the speech transmission permission mode and the speech transmission prohibition mode for the speech of the user U2 input into the passenger-seat microphone 51. In the speech transmission permission mode, the light emitting part state control unit 15 puts the passenger-seat light emitting part 53 in the first visible state, whereas in the speech transmission prohibition mode, the light emitting part state control unit 15 puts the passenger-seat light emitting part 53 in the second visible state.

The light emitting part state control unit 15 also puts the passenger-seat light emitting part 53 in the third visible state in response to the speech of the participants P1 and P2. For example, in the case where the users U1 and U2 participate in the same electronic meeting and talk to the participants P1 and P2, and the speech voice of the participant P1 is output from the driver-seat speaker 42 and the passenger-seat speaker 52, the light emitting part state control unit 15 controls the driver-seat light emitting part 43 and the passenger-seat light emitting part 53 to emit light in blue.

In the case where the vehicle 100 includes a rear seat, the rear seat may be provided with a dedicated microphone and a dedicated light emitting part as in the case of the driver seat 2 and the passenger seat 3, and the processing by the call control unit 13, the speech transmission mode switch unit 14, and the light emitting part state control unit 15 may be executed for the user seated on the rear seat. In this case, the user seated on the rear seat can also participate in the same electronic meeting as the user U1 seated on the driver seat 2 or the user U2 seated on the passenger seat 3.

In the above embodiment, the driver-seat light emitting part 43 is provided in the interior part of the front pillar on the driver seat 2 side, though the driver-seat light emitting part 43 may be provided in another interior part in the vicinity of the driver seat 2, such as a dashboard in front of the driver seat 2. The passenger-seat light emitting part 53 may also be provided in some other portions of the interior part located not on the front pillar on the passenger seat 3 side but in the vicinity of the passenger seat, such as the dashboard in front of the passenger seat 3.

In the above embodiment, the configuration in which the call support system of the present disclosure is provided in the mobile body has been shown. However, the configuration in which the call support system is provided in the mobile terminal 70 used by the user U1 may be adopted. In this case, the processor of the mobile terminal 70 executes the program 21 stored in the memory of the mobile terminal 70, so that the processor of the mobile terminal 70 functions as the electronic meeting control unit 11, the voice recognition unit 12, the call control unit 13, the speech transmission mode switch unit 14, and the light emitting part state control unit 15.

In this configuration, the call control unit 13 may transmit the call source speech information corresponding to the speech of the user U1, which is input into the microphone (equivalent to the microphone used in the mobile body in the present disclosure) provided in the mobile terminal 70, to the communication terminals 251 and 261 of the participants P1 and P2. The light emitting part state control unit 15 also communicates with an electronic control unit (ECU) of the vehicle 100 or the like to control the visible state of the driver-seat light emitting part 43. The mobile terminal 71 used by the user U2 may similarly include the call support system of the present disclosure.

In the above embodiment, the situation where the user U1 riding in the vehicle 100 participates and speaks in an electronic meeting has been described. In the case of using voice call services other than the electronic meeting, using the light emitting part state control unit 15 to switch the visible state of the driver-seat light emitting part 43 can suppress the influence on the driving operation of the user U1 and support calls of the user U1.

In the above embodiment, the vehicle 100 has been shown as the mobile body of the present disclosure, though the mobile body of the present disclosure may be flying objects, ships, and the like.

For easy understanding of the present invention, FIG. 1 is a schematic diagram showing the configuration of the call support system 1, which is categorized according to main processing contents, and the call support system 1 may be configured according to other categories. The processing of each component may be executed by a single hardware unit or may be executed by a plurality of hardware units. The processing by each component shown in FIG. 4 may be executed by a single program or may be executed by a plurality of programs.

4. Configurations Supported by Above Embodiments

The above embodiments are specific examples of the following configurations.

(Configuration 1) A call support system, including: a call control unit that executes call source speech transmission processing for transmitting call source speech information, corresponding to speech of a user of a mobile body that is input into a microphone used in the mobile body, to a call destination communication terminal used by a call partner; a speech transmission mode switch unit that switches between a speech transmission permission mode that permits execution of the call source speech transmission processing for the speech of the user by the call control unit and a speech transmission prohibition mode that prohibits execution of the call source speech transmission processing for the speech of the user by the call control unit; and a light emitting part state control unit that puts a light emitting part, provided in the mobile body to be visible to the user, in a first visible state when the speech transmission permission mode is active, and puts the light emitting part in a second visible state, different from the first visible state, when the speech transmission prohibition mode is active.

According to the call support system in the configuration 1, the user of the mobile body can easily recognize whether it is the speech transmission permission mode where the speech of the user is transmitted to the call partner or the speech transmission prohibition mode where the speech of the user is not transmitted to the partner by checking the visible state of the light emitting part provided in the mobile body. Therefore, when the user participates in an electronic meeting from the mobile body, it is possible to suppress that the user is so preoccupied with checking whether it is the speech transmission permission mode or the speech transmission prohibition mode that the driving operation of the mobile body is affected.

(Configuration 2) The call support system according to the configuration 1, in which the light emitting part state control unit switches the light emitting part between the first visible state and the second visible state by changing at least one of light emission color, illuminance, lighting and flashing, and a flashing pattern of the light emitting part.

According to the call support system in the configuration 2, the first visible state and the second visible state can be set by changing at least one of light emission color, illuminance, lighting and flashing, and a flashing pattern of the light emitting part.

(Configuration 3) The call support system according to the configuration 1 or the configuration 2, in which the call control unit executes call destination speech reception processing for receiving call destination speech information corresponding to speech of the call partner that is transmitted from the call destination communication terminal to output voice corresponding to the call destination speech information received by the call destination speech reception processing from the speaker used in the mobile body, and the light emitting part state control unit puts the light emitting part in a third visible state that is different from the first visible state and the second visible state when the voice corresponding to the call destination speech information is output from the speaker by execution of the call destination speech reception processing by the call control unit.

According to the call support system in the configuration 3, the user can recognize that the call partner is speaking by checking that the light emitting part is in the third visible state.

(Configuration 4) The call support system according to any one configuration from the configuration 1 to the configuration 3, in which the light emitting part includes a first light emitting part and a second light emitting part, the call control unit executes call destination speech reception processing for receiving call destination speech information, corresponding to speech of a plurality of call partners transmitted from a plurality of call destination communication terminals, while identifying the respective call partners, and outputs voice corresponding to the call destination speech information received by the call destination speech reception processing from the speaker used in the mobile body, and the light emitting part state control unit puts the first light emitting part in the first visible state or the second visible state, and when the voice corresponding to the call destination speech information is output from the speaker by execution of the call destination speech reception processing by the call control unit, the light emitting part state control unit puts the second light emitting part in a visible state set for the call partner corresponding to the voice output from the speaker, out of visible states individually set for the respective call partners.

According to the call support system in the configuration 4, the light emitting part including the first light emitting part and the second light emitting part enables the user to recognize whether it is the speech transmission permission mode or the speech transmission prohibition mode based on the visible state of the first light emitting part, and also enables the user to recognize that the call partner is talking based on the visible state of the second light emitting part.

(Configuration 5) The call support system according to any one configuration from the configuration 1 to the configuration 4, in which the light emitting part is also used to notify a setting status of equipment provided in the mobile body, and the first visible state and the second visible state are set to visible states different from the visible state when the setting status of the equipment is notified.

According to the call support system in the configuration 5, the light emitting part that notifies the setting of the equipment included in the mobile body can also be used as means for notifying the speech transmission permission mode or the speech transmission prohibition mode.

(Configuration 6) The call support system according to any one configuration from the configuration 1 to the configuration 5, in which the light emitting part includes a first light emitting part and a second light emitting part, the light emitting part state control unit puts the first light emitting part in the first visible state or the second visible state, and puts the second light emitting part in a visible state that notifies a setting state of equipment provided in the mobile body.

According to the call support system in the configuration 6, the light emitting part including the first light emitting part and the second light emitting part enables the user to recognize whether it is the speech transmission permission mode or the speech transmission prohibition mode based on the visible state of the first light emitting part, and also enables the user to recognize the setting state of the equipment included in the mobile body based on the visible state of the second light emitting part.

(Configuration 7) The call support system according to any one configuration from the configuration 1 to the configuration 6, in which the microphone collects speech of the user who is seated on a driver seat provided in the mobile body, and the light emitting part is provided in an interior part in a vicinity of the driver seat of the mobile body.

According to the call support system in the configuration 7, the user can recognize whether it is the speech transmission permission mode or the speech transmission prohibition mode based on the visible state of the light emitting part provided in a location where the user who is performing driving operation can easily see.

(Configuration 8) The call support system according to any one configuration from the configuration 1 to the configuration 7, in which the light emitting part is provided individually for each of a plurality of seats provided in the mobile body, the microphone is individually used by each user of the plurality of seats, the call control unit executes the call source speech transmission processing for each of the plurality of users, the speech transmission mode switch unit switches between the speech transmission permission mode and the speech transmission prohibition mode for each of the plurality of users, and the light emitting part state control unit puts the light emitting parts provided for the seats, used by the users who participate in an identical electronic meeting, out of the plurality of users, in the first visible state or the second visible state in response to switching between the speech transmission permission mode and the speech transmission prohibition mode by the speech transmission mode switch unit.

According to the call support system in the configuration 8, when a plurality of users riding in the mobile body participate in the same electronic meeting, the users see the visible state of the light emitting part provided in the respective seats in which the user is seated, so that the users can easily recognize whether it is the speech transmission permission mode or the speech transmission prohibition mode for themselves.

(Configuration 9) A call support method executed by a computer, including: a call control step of executing call source speech transmission processing for transmitting call source speech information, corresponding to speech of a user of a mobile body that is input into a microphone used in the mobile body, to a call destination communication terminal used by a call partner; a speech transmission mode switch step of switching a speech transmission permission mode that permits execution of the call source speech transmission processing for the speech of the user in the call control step and a speech transmission prohibition mode that prohibits execution of the call source speech transmission processing for the speech of the user in the call control step; and a light emitting part state control step of putting a light emitting part, provided in the mobile body to be visible to the user, in a first visible state when the speech transmission permission mode is active, and putting the light emitting part in a second visible state, different from the first visible state, when the speech transmission prohibition mode is active.

When the call support method according to the configuration 9 is executed by a computer, the operational effects similar to those of the call support system in the configuration 1 can be obtained.

(Configuration 10) A non-transitory recording medium storing a program that causes a computer to function as: a call control unit that executes call source speech transmission processing for transmitting call source speech information, corresponding to speech of a user of a mobile body that is input into a microphone used in the mobile body, to a call destination communication terminal used by a call partner; a speech transmission mode switch unit that switches between a speech transmission permission mode that permits execution of the call source speech transmission processing for the speech of the user by the call control unit and a speech transmission prohibition mode that prohibits execution of the call source speech transmission processing for the speech of the user by the call control unit; and a light emitting part state control unit that puts a light emitting part, provided in the mobile body to be visible to the user, in a first visible state when the speech transmission permission mode is active, and puts the light emitting part in a second visible state, different from the first visible state, when the speech transmission prohibition mode is active.

When the program of the configuration 10 is executed by a computer, the configuration of the call support system in the configuration 1 can be implemented.

REFERENCE SIGNS LIST

1 . . . Call support system, 10 . . . Processor, 11 . . . Electronic meeting control unit, 12 . . . Voice recognition unit, 13 . . . Call control unit, 14 . . . Speech transmission mode switch unit, 15 . . . Light emitting part state control unit, 20 . . . Memory, 21 . . . Program, 30 . . . Communication unit, 31 . . . Display, 40 . . . Driver-seat camera, 41 . . . Driver-seat microphone, 42 . . . Driver-seat speaker, 43 . . . Driver-seat light emitting part, 50 . . . Passenger-seat camera, 51 . . . Passenger-seat microphone, 52 . . . Passenger-seat speaker, 53 . . . Passenger-seat light emitting part, 60 . . . Drive mode indicator, 61 . . . Air conditioner indicator, 70, 71 . . . Mobile terminal, 100 . . . Vehicle, 200 . . . Communication network, 210 . . . Electronic meeting server, 250, 260 . . . House, 251, 261 . . . Call destination communication terminal, U1, U2 . . . User, P1, P2 . . . Participant (call partner).

What is claimed is:

1. A call support system, comprising:

a call control unit that executes call source speech transmission processing for transmitting call source speech information, corresponding to speech of a user of a mobile body that is input into a microphone used in the mobile body, to a call destination communication terminal used by a call partner;

a speech transmission mode switch unit that switches between a speech transmission permission mode that permits execution of the call source speech transmission processing for the speech of the user by the call control unit and a speech transmission prohibition mode that prohibits execution of the call source speech transmission processing for the speech of the user by the call control unit; and a light emitting part state control unit that puts a light emitting part, provided in the mobile body to be visible to the user, in a first visible state when the speech transmission permission mode is active, and puts the light emitting part in a second visible state, different from the first visible state, when the speech transmission prohibition mode is active.

2. The call support system according to claim 1, wherein the light emitting part state control unit switches the light emitting part between the first visible state and the second visible state by changing at least one of light emission color, illuminance, lighting and flashing, and a flashing pattern of the light emitting part.

3. The call support system according to claim 1, wherein the call control unit executes call destination speech reception processing for receiving call destination speech information corresponding to speech of the call partner that is transmitted from the call destination communication terminal to output voice corresponding to the call destination speech information received by the call destination speech reception processing from the speaker used in the mobile body, and the light emitting part state control unit puts the light emitting part in a third visible state that is different from the first visible state and the second visible state when the voice corresponding to the call destination speech information is output from the speaker by execution of the call destination speech reception processing by the call control unit.

4. The call support system according to claim 1, wherein the light emitting part includes a first light emitting part and a second light emitting part, the call control unit executes call destination speech reception processing for receiving call destination speech information, corresponding to speech of a plurality of call partners transmitted from a plurality of call destination communication terminals while identifying the respective call partners, and outputs voice corresponding to the call destination speech information received by the call destination speech reception processing from a speaker used in the mobile body, and the light emitting part state control unit puts the first light emitting part in the first visible state or the second visible state, and when the voice corresponding to the call destination speech information is output from the speaker by execution of the call destination speech reception processing by the call control unit, the light emitting part state control unit puts the second light emitting part in a visible state set for the call partner corresponding to the voice output from the speaker, out of visible states independently set for the respective call partners.

5. The call support system according to claim 1, wherein the light emitting part is also used to notify a setting status of equipment provided in the mobile body, and the first visible state and the second visible state are set to visible states different from the visible state when the setting status of the equipment is notified.

6. The call support system according to claim 1, wherein the light emitting part includes a first light emitting part and a second light emitting part, and the light emitting part state control unit puts the first light emitting part in the first visible state or the second visible state, and puts the second light emitting part in a visible state that notifies a setting state of equipment provided in the mobile body.

7. The call support system according to claim 1, wherein the microphone collects speech of the user who is seated on a driver seat provided in the mobile body, and the light emitting part is provided in an interior part in a vicinity of the driver seat of the mobile body.

8. The call support system according to claim 1, wherein the light emitting part is provided individually for each of a plurality of seats provided in the mobile body, the microphone is individually used by each user of the plurality of seats, the call control unit executes the call source speech transmission processing for each of the plurality of users, the speech transmission mode switch unit switches between the speech transmission permission mode and the speech transmission prohibition mode for each of the plurality of users, and the light emitting part state control unit puts the light emitting parts provided for the seats, used by the users who participate in an identical electronic meeting, out of the plurality of users, in the first visible state or the second visible state in response to switching between the speech transmission permission mode and the speech transmission prohibition mode by the speech transmission mode switch unit.

9. A call support method executed by a computer, comprising:

a call control step of executing call source speech transmission processing for transmitting call source speech information, corresponding to speech of a user of a mobile body that is input into a microphone used in the mobile body, to a call destination communication terminal used by a call partner;

a speech transmission mode switch step of switching between a speech transmission permission mode that permits execution of the call source speech transmission processing for the speech of the user in the call control step and a speech transmission prohibition mode that prohibits execution of the call source speech transmission processing for the speech of the user in the call control step; and a light emitting part state control step of putting a light emitting part, provided in the mobile body to be visible to the user, in a first visible state when the speech transmission permission mode is active, and putting the light emitting part in a second visible state, different from the first visible state, when the speech transmission prohibition mode is active.

10. A non-transitory recording medium storing a program that causes a computer to function as:

a call control unit that executes call source speech transmission processing for transmitting call source speech information, corresponding to speech of a user of a mobile body that is input into a microphone used in the mobile body, to a call destination communication terminal used by a call partner;

a speech transmission mode switch unit that switches between a speech transmission permission mode that permits execution of the call source speech transmission processing for the speech of the user by the call control unit and a speech transmission prohibition mode that prohibits execution of the call source speech transmission processing for the speech of the user by the call control unit; and a light emitting part state control unit that puts a light emitting part, provided in the mobile body to be visible to the user, in a first visible state when the speech transmission permission mode is active, and puts the light emitting part in a second visible state, different from the first visible state, when the speech transmission prohibition mode is active.

\* \* \* \* \*